United States Patent [19]

Matner et al.

[11] Patent Number: 5,278,228

[45] Date of Patent: Jan. 11, 1994

[54] POLYSILOXANE GRAFT COPOLYMER LATEX FOR STRENGTHENING TEXTILE STRUCTURES

[75] Inventors: Martin Matner, Odenthal; Raoul Resz, Bergisch Gladbach; Heinrich Alberts, Odenthal; Volker Damrath, Burscheid, all of Fed. Rep. of Germany

[73] Assignee: Bayer Aktiengesellschaft, Leverkusen, Fed. Rep. of Germany

[21] Appl. No.: 539,762

[22] Filed: Jun. 18, 1990

[30] Foreign Application Priority Data

Jul. 8, 1989 [DE] Fed. Rep. of Germany ....... 3922521

[51] Int. Cl.$^5$ ............................................. C08L 51/08
[52] U.S. Cl. ..................... 524/837; 525/479; 524/838; 528/25; 528/26; 528/30
[58] Field of Search ............ 525/479; 528/25, 26; 524/837, 838

[56] References Cited

U.S. PATENT DOCUMENTS

| | | | |
|---|---|---|---|
| 3,532,729 | 10/1970 | Cekada et al. | 525/479 |
| 4,070,414 | 1/1978 | Falender et al. | 525/479 |
| 4,071,577 | 1/1978 | Falender et al. | 260/827 |
| 4,123,472 | 10/1978 | Getson | 525/479 |
| 4,579,636 | 4/1986 | Inoue et al. | 522/99 |

FOREIGN PATENT DOCUMENTS

| | | |
|---|---|---|
| 691718 | 3/1983 | Belgium . |
| 217257 | 4/1987 | European Pat. Off. . |
| 2717227 | 11/1977 | Fed. Rep. of Germany . |

*Primary Examiner*—Ralph H. Dean
*Attorney, Agent, or Firm*—Sprung Horn Kramer & Woods

[57] ABSTRACT

A binder for textile structures which are graft copolymer latices in which the following are incorporated in the graft copolymer:
(1) as graft substrate, from 40 to 70% by weight, of a polyorganosiloxane end blocked with hydroxyl groups as indicated in the following general formula

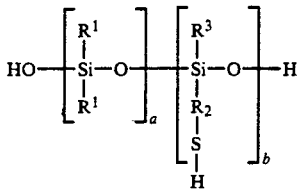

wherein
$R^1$ denotes alkyl groups having 1 to 24 carbon atoms or aryl groups having 6 to 10 carbon atoms,
$R^2$ denotes divalent alkylene groups having 1 to 8 carbon atoms,
$R^3$ denotes alkyl groups having 1 to 24 carbon atoms, aryl groups, alkoxy groups having 1 to 6 carbon atoms or a hydroxyl group,
$R^2$ and $R^3$ together with the silicon atom may form a 5 membered or 6 membered ring containing a trivalent unbranched or branched alkyl group having to 8 carbon atoms, and
a stands for 80 to 99 mol %,
b stands for 1 to 20 mol %, and
a+b=100 mol %
and the viscosity of the polymer determined at 25° C. is from 100 to 100,000 mPa.s,
(2) as grafted vinyl polymer, from 30 to 60% by weight, of styrene and/or α-methyl styrene, (meth)acrylic acid ester, (meth)-acrylonitrile or mixtures of these monomers and optionally one or more vinyl monomers of the general formula

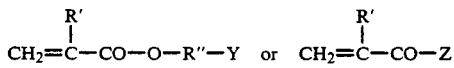

wherein
R' denotes a hydrogen atom or a methyl group,
R" denotes a alkyl group having 1 to 18 carbon atoms,
Y denotes a hydrogen atom or the group OH or OR and
Z denotes OH or

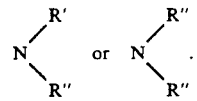

8 Claims, No Drawings

POLYSILOXANE GRAFT COPOLYMER LATEX FOR STRENGTHENING TEXTILE STRUCTURES

This invention relates to a binder based on latices of graft copolymers of special vinyl monomers or mixtures thereof on polyorganosiloxanes containing mercapto groups and to its use as a high quality temperature resistant, oxidation resistant and solvent resistant binder.

When assessing the butadiene copolymer emulsions conventionally used as binders, it is necessary to take into account the temperature resistance and resistance to oxidation of these copolymers. Butadiene binders are not suitable where high elasticity is required in constant use at high temperatures. It is well known that acrylate copolymers have excellent aging properties but they are unfortunately lacking in low temperature flexibility when they have high filler contents and the possibility of using them in constant service at temperatures from 150° to 200° C. is very limited.

It is obvious from these comments on the state of the art that there is an urgent need for binders which combine good mechanical and elastomeric properties at low temperatures with good resistance to high temperatures and to oxidation so that they can still be used at temperatures from 150° to 200° C. Another important requirement to be met by such products is that they should have good resistance to organic solvents and especially to hydrocarbons such as fuels or oils.

Latices of graft copolymers of styrene, acrylonitrile, methyl methacrylate, acrylic and methacrylic acid and their esters on polyorganosiloxanes containing mercapto groups are known from the literature. Thus the preparation of polyorganosiloxane latices containing mercapto groups and the grafting of these latices with a mixture of ethyl acrylate, methyl methacrylate, methacrylic acid and acrylic acid are described in U.S. Pat. No. 3,575,910, Example 17. In the case described there, the latex of a polyorganosiloxane consisting of about 60.3% by weight of $(CH_3)_2$ SiO units, 39.6% by weight of $C_6H_5SiO_{3/2}$ units and 0.15% by weight of $HS-(CH_2)_3 SiO_{3/2}$ units was grafted with a mixture of the monomers mentioned above. The resulting graft polymer contained about 31% by weight of polyorganosiloxanes about 43% by weight of ethyl acrylate, about 25% by weight of methyl methacrylate and a total of about 1% by weight of acrylic and methacrylic acid. graft copolymers of this type were proposed as paints and as coatings for construction materials.

U.S. Pat. No. 3,532,729 describes inter alia the preparation of graft copolymers of vinyl monomers on polyorganosiloxanes containing mercapto groups in which at least 1% by weight of units corresponding to the following formula

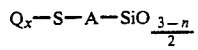

wherein
A denotes an alkylene or arylene radical,
$Q_x$ denotes a vinyl polymer chain,
x denotes an integer greater than 1,
R" denotes a methyl or phenyl group and
n denotes an integer with a value from 0 to 2 is incorporated by polymerisation. The vinyl monomers used may be any polymerizable compounds containing double bonds, e.g. butadiene, chloroprene, styrene, acrylonitrile, methyl methacrylate, ethyl acrylate or vinyl acetate. The graft copolymers are intended to be used as components of paints, as additives for improving the thermostability of polymer composites and as textile finishes and in combination with styrene as graft monomer for the preparation of injection moulding compounds.

DE-OS 2 717 227 describes the preparation of graft copolymers of styrene, methyl methacrylate and a mixture of styrene and acrylonitrile on polyorganosiloxane latices containing mercapto groups, in which the polyorganosiloxane component consists of 90 to 99.7 mol % of dimethyl siloxane units and 0.3 to 10 mol % of organosiloxane units containing mercapto groups. The process is used for improving the impact strength of thermoplastic vinyl polymers. Trifunctional and/or tetrafunctional siloxanes are incorporated during the equilibration reaction for the purpose of achieving the necessary cross-linking of the latex particles. The use of such siloxane units which have a cross-linking action constitutes one of the main features of the process described. It is for this reason that either mercapto propylene trimethoxy silane or cyclic mercaptopropylmethylsiloxane in combination with ethyl ortho silicate is used in the examples of practical application. Another important feature of the process is that the polyorganosiloxane content of the graft polymers is from 1 to 40% by weight.

In none of the documents mentioned is it proposed or even suggested that graft copolymers of polyorganosiloxanes containing mercapto groups and having a particular composition have excellent properties as binders for textile structures. It is an object of the present invention to provide high quality, permanently elastic binders of this type which have rubber technical properties hitherto unachievable on the basis of vinyl polymers, excellent high temperature resistance and good resistance to solvents.

It has now been found that binders for textile structures may be obtained with high temperature resistance and oxidation resistance and good elastomeric properties by using for this purpose graft copolymer latices of vinyl monomers on polyorganosiloxanes in which the following are incorporated in the graft copolymer:

1. As graft substrate, from 40 to 70% by weight, preferably from 50 to 65% by weight, of a polyorganosiloxane end blocked with hydroxyl groups as indicated in the following general formula

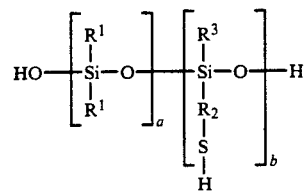

wherein
$R^1$ denotes alkyl groups having 1 to 24 carbon atoms or aryl groups having 6 to 10 carbon atoms,
$R^2$ denotes straight-chain or branched divalent alkylene groups having 1 to 8 carbon atoms,
$R^3$ denotes alkyl groups having 1 to 24 carbon atoms, aryl groups, alkoxy groups having 1 to 6 carbon atoms or a hydroxyl group,
$R^2$ and $R^3$ together with the silicon atom may form a 5 membered or 6 membered ring containing a trivalent unbranched or branched alkyl group having 4 to 8 carbon atoms, and a denotes 80 to 99 mol %, preferably 90 to 97 mol %,
b denotes 1 to 20 mol %, preferably 3 to 10 mol %, and a+b=100 mol %
and the viscosity of the polymer determined at 25° C. is from 100 to 100,000 mPa.s, 2. as grafted vinyl polymer, from 30 to 60% by weight, preferably from 35 to 50% by weight, of styrene and/or α-methylstyrene, (meth)acrylic acid ester, (meth)acrylonitrile or mixtures of these monomers and optionally one or more vinyl monomers corresponding to the following general formula

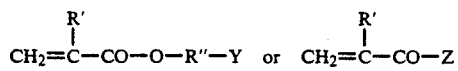

wherein

R' denotes a hydrogen atom or a methyl group,
R'' denotes a straight chained or branched alkyl group having 1 to 18 carbon atoms,
Y denotes a hydrogen atom or the group OH or OR and
Z denotes OH or

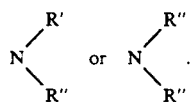

The films and coatings obtained by casting and drying from the latices prepared according to the invention differ from those of known graft copolymers containing trifunctional or tetrafunctional siloxane units in that they are still to a large extent uncross-linked after the grafting reaction carried out with exclusion of air, i.e. they are still readily soluble in numerous organic solvents and therefore readily film forming. These uncrosslinked films, however, are still very soft and frequently tacky and have a very low tensile strength. It is only after they have been heated to temperatures above 100° C. and up to 250° C. in air that their tensile strength rapidly rises from about 1 mPa.s to about 5-15 mPa.s. At the same time, the films acquire good rubbery elastic properties, i.e. a substantially reversible elongation of about 100 to 500%, which is an important property for their use as binders. When heated, they undergo cross-linking without the aid of additives, i.e. they are self curing. The mechanism of cross-linking is not known with certainty but an explanation would be that bridge building brought about by oxidation takes place by way of the mercapto groups which have not been completely used up by the grafting reaction so that S—S bonds are formed. The amount of mercapto groups present in the polyorganosiloxane component used as graft basis has an important influence on the optical, mechanical and other application technical properties of the graft copolymers. Less than 1 mol % of organosiloxane units containing mercapto groups is not sufficient for obtaining the degree of grafting necessary for practical application and ensuring that the subsequent vulcanization will result in a sufficient cross-linking density for use. Although it is possible to use more than 20 mol % of organosiloxane units containing mercapto groups, it is unnecessary for most purposes.

The latices of the polyorganosiloxanes containing mercapto groups are prepared by known processes of equilibrating the mixtures of linear or cyclic polyorganosiloxanes such as octaalkyl-cyclotetrasiloxane with corresponding mercaptoalkyl-alkylcyclotetrasiloxanes or with mercaptoalkyl-alkyldialkyl silanes in the presence of acid or alkaline equilibrating catalysts. Suitable catalysts include inter alia those disclosed in U.S. Pat. Nos. 2,891,920 and 3,294,725, i.e. quaternary ammonium hydroxides or sulphonic acids containing hydrocarbon groups with about 12 to 24 carbon atoms, such as dodecyl-trimethyl ammonium hydroxide, dioctadecyldimethyl-ammonium hydroxide and dodecylbenzene sulphonic acid. These equilibrating catalysts also function as emulsifiers. Since the requirement for emulsifier is generally greater than that for catalyst, the free acids or bases are frequently used as mixtures with their water soluble salts.

The main proportion of the polyorganosiloxanes present in the latex is made up of 80 to 99 mol %, preferably 90 to 97 mol %, of dialkyl siloxane units, preferably dimethyl siloxane units. In the organosiloxane units containing mercapto groups as shown in the following structure and already mentioned above:

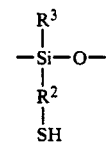

$R^2$ may be branched or unbranched divalent alkylene groups having 1 to 8 carbon atoms, and $R^3$ may be alkyl groups having 1 to 24 carbon atoms, aryl groups, alkoxy groups having 1 to 6 carbon atoms or a hydroxyl group. The following are examples of such siloxane units: 2-mercaptoethyl-methyl-siloxane, 3-mercaptopropyl-methyl-siloxane, 3-mercaptohexyl-methyl-siloxane, 3-mercaptopropyl-phenylsiloxane, 3-mercaptopropylethoxy-siloxane, 3-mercaptopropylhydroxy-siloxane, etc.. Organosiloxane units in which $R^2$ and $R^3$ together with the silicon atom form a 5 or 6 membered ring containing a trivalent, straight chained or branched alkyl group having 4 to 8 carbon atoms may, for example, correspond to the following structures:

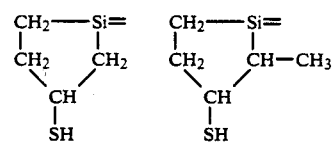

The polyorganosiloxanes may also contain a small proportion, amounting to 0.1 to 5 mol %, of siloxane units having the formula $HSR^2SiR^1O_{3/2}$ or $HSR^2SiR^1O_{\frac{1}{2}}$. Higher proportions of the former give rise to latex particles which are too highly cross-linked whereas the latter used in large quantities are too regulating. Mixtures of the above mentioned mercaptoalkyl-alkyl-siloxane units may also be introduced.

When preparing the latices, the emulsifier may be stirred into the organosiloxane mixture, and the water may then be added with stirring or, conversely, the emulsifier may be dissolved in water and the organosiloxane mixture may then be slowly added with vigorous stirring. Vigorous stirring is necessary in both cases and preferably also emulsification carried out with very powerful shearing forces using a homogenizer.

The ratio by weight of the aqueous phase to the organic phase is not critical but should be in the range of from 4:1 to 1:2 and is preferably from 2:1 to 1:1.

Equilibration is generally carried out pressure free but it is advantageous, especially when readily volatile constituents are present, to carry it out in closed reactors at the pressure of the mixture itself or at elevated pressure.

The temperature of equilibration is maintained at about 60° to 100° C., preferably at 70° to 80° C. Higher temperatures up to about 200° C. may be employed but are less advantageous since the average molecular weight of the polyorganosiloxane depends to a large extent on the equilibration temperature. The highest molecular weights may be obtained at low temperatures of about 20° to 50° C. but it must be considered that the reaction velocity is very low under such conditions so that very long reaction times are required for obtaining a substantial conversion rate. About 5 to 12 hours are generally sufficient at temperatures in the region of 70° to 80° C.

After completion of the equilibration reaction, the latex is adjusted to pH 7 as accurately as possible by the addition of alkali metal liquors or ammonia in the case of acid catalyzed equilibration or of hydrochloric acid or acetic acid in the case of alkaline catalyzed equilibration. When determining the average molecular weight by viscosity measurements, it should be remembered that the polyorganosiloxanes containing mercapto groups tend to cross-link in the presence of air. Both equilibration and isolation of the product must therefore be carried out with complete exclusion of air, and viscosity measurements are generally not carried out in view of this tendency to undergo cross-linking.

The grafting of vinyl monomers may be carried out immediately after neutralization of the polyorganosiloxane latex, using the same reactor. If, however, the cyclic polysiloxanes still present, which generally only amount to a few % by weight of the quantity originally used, are to be removed before the grafting reaction, then a steam distillation under slightly reduced pressure is carried out in this phase. The quantity of emulsifier present in the polyorganosiloxane is generally also sufficient for the grafting reaction although in some cases it may be necessary to add a small quantity of emulsifier, depending on the nature and quantity of the vinyl monomers to be grafted. In some cases, it may be advantageous to supplement the anionic or cationic emulsifiers present from the equilibration with nonionic emulsifiers.

The composition of the monomer mixture to be grafted varies from case to case within the claimed limits, depending on the requirements of the intended field of application. If resistance to heat is particularly important in addition to the rubber technical properties generally required, then the graft copolymers of styrene may be used, optionally with the addition of a small proportion of acrylates such as ethyl, n-butyl or 2-ethylhexyl acrylate or methacrylates of aliphatic alcohols containing from 1 to 18 carbon atoms. For introducing other reactive groups capable of cross-linking reactions, small quantities of other vinyl monomers such as acrylic acid, methacrylic acid, acrylamide, methacrylamide, 2-hydroxypropyl acrylate, 2-hydroxyethyl methacrylate, etc. may also be incorporated by polymerization. Methyl methacrylate is preferably used in combination with styrene and/or other alkyl acrylates. If solvent resistance or oil resistance are more important for the intended field of application of the product, it is desirable to use graft copolymers containing a higher proportion of grafted acrylonitrile. Acrylonitrile imparts a very high tensile strength to the graft copolymers after vulcanization in much the same way as styrene and to a less extent methyl methacrylate. On the other hand, acrylonitrile is not always easily grafted on the polyorganosiloxane latices as the only vinyl monomer. In such cases, the vinyl monomer mixture preferably contains at least 25 to 30% by weight of styrene and/or an acrylic or methacrylic acid ester.

The grafting reaction may be carried out by various processes conventionally employed for emulsion polymerization e.g. the so called batch process or various injection processes. In the batch process, which is frequently preferred because easily carried out, the polyorganosiloxane latex is introduced into the reaction vessel and the monomer mixture is added with vigorous stirring in the course of about one hour at a temperature at which no polymerisation yet takes place, i.e. at temperatures from 0° to 50° C., preferably from 10° to 30° C., possibly together with a polymerization initiator which is soluble in the monomer mixture or with a mixture of various polymerization initiators differing in their decomposition temperatures. The mixture is then stirred at this temperature for up to 18 hours to provide time and opportunity for the monomer mixture to penetrate and become distributed in the polysiloxane particles. After this initial swelling period, polymerization is started by a stepwise increase in temperature and carried to completion. This method is not always practicable on account of the sometimes very vigorous exothermic course of polymerization. The method may be modified by adding the relatively concentrated latex, which has been pretreated in the cold as described above, to a small quantity of emulsifier solution at a temperature adapted to the decomposition temperature of the polymerization initiator and at such a rate that the heat of polymerization produced can be removed at the same time.

Another alternative method in this case consists of slowly adding a water soluble polymerization initiator, e.g. potassium peroxydisulphate or a redox initiator, to the latex at a temperature adapted to the decomposition point of the initiator.

The above described preliminary swelling of the polyorganosiloxane latex particles may, of course, be omitted and the monomer mixture and the initiator may be added simultaneously to the latex at the polymerization temperature or the process may be carried out continuously.

Any monomers which have not undergone polymerization may be removed, if necessary, by steam distillation carried out at reduced pressure.

Radical polymerization of the vinyl monomers may be started in known manner by the addition of radical formers, treatment with UV rays or $\alpha$, $\beta$ or $\gamma$ rays or by heat without further additives. For starting the polymerization of vinyl monomers with the aid of radical formers, which are preferably employed, the radical formers are added in quantities of from 0.001 to 10% by weight, preferably from 0.1 to 1 5% by weight, based on the total mixture of polyorganosiloxanes and vinyl monomers. The following are examples of radical formers: azo initiators such as azo-bis-isobutyric acid nitrile (AIBN), azo esters, azo amino esters and azo-N-alkylamides; peroxides such as dibenzoyl peroxide, dilauroyl peroxide, di-tert.-butyl peroxide and 2,4- dichlorobenzoyl peroxide; peroxy esters such as butyl perpivalate, tert.-butyl peroctoate, tert.-butyl perbenzoate and tert.-butyl perneodecanoate; percabonates such as cyclohexyl percarbonate and bis-isopropyl percarbonate, and hydroperoxides such as tert.-hydroperoxide and cumyl hydroperoxide.

The polymerization may also be started in the presence of thermally labile, highly substituted ethane derivatives such as benzopinacol and its derivatives.

Polymerization may also be started by means of redox initiator systems which may be used at substantially lower temperatures than radical formers which decompose by heat alone. The following are examples of such redox initiators: combinations of peroxides and amines, e.g. benzoyl peroxide and triethylamine, trialkyl boron compounds and oxygen, hdyroperoxides and sulphinic acids, formaldehyde or aldoses or combinations with transition metal salts of low valencies and sulphur dioxide/peroxide redox systems.

The graft copolymerization may be carried out continuously or batchwise, pressure free or at pressures of up to 200 bar and at reaction temperatures of from 0° to 200° C., preferably from 20° to 150° C.

The polymerization reaction may be carried out, if desired, in the presence of molecular weight regulators although these are in most cases not necessary in view of the regulating effect of the mercapto groups already present in the polyorganosiloxanes. Examples of suitable regulators are given in EP-PS-0 084 321 on pages 10 to 12.

Fields of application of the latices according to the invention are mainly those where high demands are made on the resistance to polar solvents, to extreme heat conditions (high temperature stability) and extremely low temperatures (maintenance of the flexibility of the polymer film at exceptionally low temperatures). Examples of such articles include technical articles (hoses, collars and washers, seals, industrial gloves), cylinder head seals and filter materials (sheet products of composite inorganic or organic fibres).

The invention will now be illustrated with the aid of the following Examples.

EXAMPLE 1

I) 1550 g of octamethyl cyclotetrasiloxane were introduced into a dispersion vessel of 6 liters capacity equipped with a high power dissolver with two 10 mm dissolver discs and 180 g of mercaptopropyl-methyl dimethoxy silane were added with stirring at 1000 revs per min, followed by 38 g of dodecyl benzene sulphonic acid. A homogeneous mixture was obtained after 5 minutes. 2300 g of deionized water were then run in with stirring in the course of 20 minutes and stirring was continued for 1 hour at room temperature. The resulting emulsion was then homogenized in a Gaulin machine for 12 minutes at 200 bar.

The homogeneous emulsion was transferred to a sulphurating beaker of 4 liter capacity equipped with a butterfly stirrer and was heated to 85° C. with stirring at 170 revs per min for 2.5 hours. When the latex had cooled to room temperature, it was adjusted to pH 9.25 by the addition of 23.9 g of 5N sodium hydroxide solution. A milky white emulsion containing 38.1% by weight of non-volatile constituents was obtained. This corresponds to a polymerization conversion of about 90% by weight.

The average particle size determined by the laser light scattering method was 200 nm with a narrow distribution width (K2 value) of 0.034. The gel content was found to be about 48.5% by weight and the swelling index was about 48% by weight. The latex contained 1.0% by weight of sodium dodecyl benzene sulphonate as emulsifier.

II) 485 g of the polyorganosiloxane latex described above were introduced into a glass stirrer vessel of 2 liters capacity equipped with an impeller stirrer and the latex was diluted with 233 g of deionized water with stirring at 200 revs per min and the air was displaced from the reactor by the introduction of nitrogen. A solution of 1.8 g of azo-bis-isobutyric acid nitrile in 180 g of styrene was added dropwise with stirring in the course of one hour and the mixture was then stirred at room temperature for 18 hours and the temperature of the latex was thereafter raised at hourly intervals to 60° C., 70° C. and 80° C. The latex was finally heated to 90° C. for four hours and cooled with stirring. A viscous latex containing 40.9% by weight of non-volatile constituents and having a pH of 5.71 was obtained. Translucent, soft and somewhat sticky films having a slightly matt but smooth surface could be cast from the latex. After 20 minutes heating at about 160° C., these films were tack free and had a satisfactory tensile strength and rubberly elastic properties.

EXAMPLE 2

1,635 g of a polyorganosiloxane latex prepared as described in Example 1 and containing 37.7% by weight of non-volatile constituents were introduced into a glass vessel of 4 liters capacity equipped with paddle stirrer. The latex contained 600 g of polyorganosiloxane with a mercapto group content of about 2% by weight and 16.2 g of sodium-dodecyl benzene sulphonate as emulsifier. After dilution of the latex with 641 g of deionized water, a mixture of 400 g of styrene, 20 g of methacrylic acid and 4 g of azo-bis-isobutyric acid nitrile was pumped in at a uniform rate in the course of one hour and the latex was stirred at room temperature for 18 hours. Polymerization was then completed while the temperature was raised at one hourly intervals to 60° C., 70° C. and 80° C. and finally kept at 90° C. for 4 hours.

When the latex had cooled to room temperature, it was found to be a medium viscosity product containing 39.5% by weight of non-volatile constituents. The pH of the latex was 5.41. After the film cast from the latex had been heated in the drying cupboard at about 160° C. for 20 minutes, it was found to be tear resistant and translucent and to have good rubbery elastic properties.

EXAMPLE 3

162 g of a polyorganosiloxane latex prepared as described in Example 1 and containing about 2% by weight of mercapto groups and 38.0% by weight of non-volatile constituents were introduced into a round bottomed flask of 500 ml capacity and diluted with 78 g of water. A mixture of 30 g of acrylonitrile, 20 g of ethyl acrylate and 0.4 g of azo-bisbutyric acid nitrile was added dropwise at a uniform rate in the course of one hour at room temperature with stirring. After the stirred latex had been left at room temperature for ten hours, polymerization was continued by stepwise raising of the temperature at two hourly intervals to 60° C. and 70° C. and completed by four hours further heating at 80° C.

The latex obtained had a solids content of 37.5% by weight and was free from precipitates. The latex was diluted with 250 ml of water to remove residues of monomers and about the same quantity of distillate was distilled off at reduced pressure at about 50° C. The latex, which contained 39.3% by weight of non-volatile material, could be cast to form uniform, translucent films having a smooth but somewhat matt surface. After 20 minutes heating to about 160° C., a very solidified material was obtained whose rubbery elastic properties were not highly developed on account of its relatively high acrylonitrile content. The films were found to have good resistance to hydrocarbons and mineral oil. On account of their acrylonitrile content, their swelling in various organic solvents such as perchloroethylene or trichloroethylene was greatly reduced.

EXAMPLE 4

Example 3 was repeated but instead of the vinyl monomer mixture described there, a mixture of 25 g of acrylonitrile, 15 g of ethyl acrylate and 0.4 g of azo-bis-isobutyronitrile was added dropwise to the latex.

The film cast from the latex was only slightly cloudy and was smooth and hardly tacky. When heated to about 160° C. it underwent significant solidification. The rubbery elastic properties of the product were even more advantageous than those of the product obtained in Example 3.

EXAMPLE 5

Films about 1 mm in thickness were produced from the polymer dispersion 3(3739M) described in Example 5 and a known comparison latex 1 which had good solvent resistance (polymer composition: 54% butadiene, 41% acrylonitrile, 5% methacrylic acid) by casting the substance on a glass plate and drying in air at room temperature. After 10 minutes heating at 150° C., circular samples 20 mm in diameter were produced from the films to determine the solvent resistance. The following increases in volume (in percent) were obtained after storage in toluene and trichloroethylene:

| polymer dispersion | 1 h | 106 | 130 |
|---|---|---|---|
| Example 3: | 8 h | 108 | 140 |
| | 48 h | 130 | 155 |
| Comparison latex: | 1 h | 361 | 163 |
| | 8 h | disintegrated | disintegrated |
| Comparison latex: | 48 h | disintegrated | disintegrated |

EXAMPLE 6

Films were produced from the following dispersions by the method described in Example of Application 5:
a) polymer dispersion 1 (Example 1)
b) polymer dispersion 2 (Example 2)
c) comparison dispersion 2 (polymer composition: 72% of butadiene, 28% of acrylonitrile)
d) comparison dispersion 3 (polymer composition: 76% of butadiene, 24% of styrene)
e) comparison dispersion 4 (polymer composition: 100% of 2-chloro-butadiene-(1,3)).

Test samples of these five films (10×60×1 mm) were kept at −70° C. for 3 hours and the long sides of the films were then brought together by bending the films over through 180° at this temperature. Films a) and b) withstood this treatment without visible damage; films c) and e) broke under these test conditions.

EXAMPLE 7

Films of polymer dispersions 1, 2 and 3 and of a conventional polyacrylic ester dispersion (comparison latex 5: polymer composition: 77.5% of ethyl acrylate: 22.5% of acrylonitrile and 3% of acrylamide) were aged in hot air at 200° C. for 72 hours. The tensile strength and elongation at break of the films (DIN 53 504, test samples S III) were determined before and after aging:

| | | Tensile Strength (mPa) | Elongation at break (%) |
|---|---|---|---|
| Polymer dispersion 1 | 0 | 5 · 2 | 330 |
| | 72 h | 1 · 6 | 60 |
| Polymer dispersion 2 | 0 | 5 · 5 | 440 |
| | 72 h | 2 · 1 | 45 |
| Polymer dispersion 3 | 0 | 7 · 0 | 170 |
| | 72 h | 6 · 2 | 50 |
| Comparison latex | 0 | 10 · 5 | 300 |
| | 72 h | hardened | |

It will be appreciated that the instant specification and claims are set forth by way of illustration and not limitation, and that various modifications and changes may be made without departing from the spirit and scope of the present invention.

What is claimed is:

1. A self-curing siloxane composition for textile structures which after curing has temperature resistance and oxidation resistance and good elastomeric properties comprising aqueous graft copolymer latices of vinyl monomers on polyorganosiloxane in which the following are incorporated in the graft copolymer:
(1) as graft substrate, from 50 to 70% by weight of a polyorganosiloxane end blocked with hydroxyl groups having the following formula

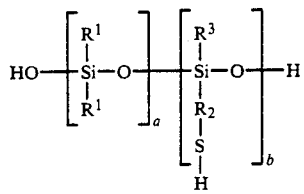

wherein
$R^1$ denotes alkyl groups having 1 to 24 carbon atoms or aryl groups having 6 to 10 carbon atoms,
$R^2$ divalent alkylene groups having 1 to 8 carbon atoms,
$R^3$ denotes alkyl groups having 1 to 24 carbon atoms, aryl groups, alkoxy groups having 1 to 6 carbon atoms or a hydroxyl group, or
$R^2$ and $R^3$ together with the silicon atom may form a 5 membered or 6 membered ring containing a trivalent unbranched or branched alkylene group having 4 to 8 carbon atoms, and
a stands for 80 to 99 mol %,
b stands for 1 to 20 mol %, and
a+b amount to 100 mol %,
and the viscosity of the polyorganosiloxane determined at 25° C. is from 100 to 100,000 mPa.S,
(2) as grafted vinyl polymer, from 30 to 50 by weight, of styrene, α-methyl styrene, methacrylic acid ester, acrylic acid ester, meth-acrylonitrile, acrylonitrile or mixtures of these monomers.

2. The siloxane composition according to claim 1, wherein the grafted vinyl polymer further comprises one or more vinyl monomers corresponding to the following general formula

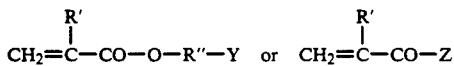

wherein
R' denotes a hydrogen atom or a methyl group,
R" denotes a divalent, unbranched or branched alkylene group having 1 to 18 carbon atoms,
R'" denotes an unbranched or branched alkyl group having 1 to 18 carbon atoms,
Y denotes a hydrogen atom or the group OH or OR, and
Z denotes OH or the group

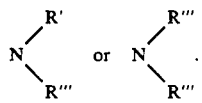

3. A siloxane composition according to claim 1, wherein the graft copolymer comprises 50 to 65% by weight of polyorganosiloxane end blocked with hydroxyl groups.

4. A siloxane composition according to claim 1, wherein the graft copolymer comprises 35 to 50% by weight of grafted vinyl polymer.

5. A graft copolymer of vinyl monomers on polyorganosiloxanes in which the following are incorporated in the graft copolymer:
(1) as graft substrate, from 50 to 70% by weight of a polyorganosiloxane end blocked with hydroxyl groups having the formula

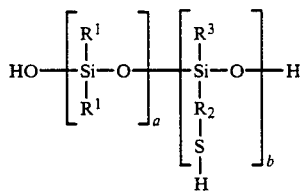

wherein
R¹ denotes alkyl groups having 1 to 24 carbon atoms or aryl groups having 6 to 10 carbon atoms,
R² denotes divalent alkylene groups having 1 to 8 carbon atoms,
R³ denotes alkyl groups having 1 to 24 carbon atoms, aryl groups, alkoxy groups having 1 to 6 carbon atoms or a hydroxyl group, or
R² and R³ together with the silicon atom may form a 5 membered or 6 membered ring containing a trivalent unbranched or branched alkylene group having 4 to 8 carbon atoms, and
a stands for 80 to 99 mol %,
b stands for 1 to 20 mol %, and
a+b amount to 100 mol %, and the viscosity of the polyorganosiloxane determined at 25° C. is from 100 to 100,000 mPa.S,
(2) as grafted vinyl polymer, from 30 to 50 by weight, of styrene, α-methyl styrene, methacrylic acid ester, acrylic acid ester, meth-acrylonitrile, acrylonitrile or mixtures of these monomers.

6. The graft copolymer according to claim 5, wherein the grafted vinyl polymer comprises one or more vinyl monomers corresponding to the following general formula

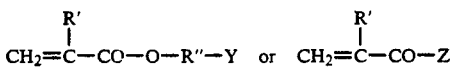

wherein
R' denotes a hydrogen atom or a methyl group,
R" denotes a divalent, unbranched or branched alkylene group having 1 to 18 carbon atoms,
R'" denotes an unbranched or branched alkyl group having 1 to 18 carbon atoms,
Y denotes a hydrogen atom or the group OH or OR, and
Z denotes OH or the group

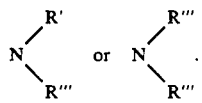

7. An aqueous graft copolymer latex of vinyl monomers on polyorganosiloxanes in which the following are incorporated in the graft copolymer:
(1) as graft substrate, from 50 to 70% by weight of a polyorganosiloxane end blocked with hydroxyl groups having the following formula

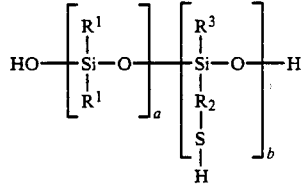

wherein
R¹ denotes alkyl groups having 1 to 24 carbon atoms or aryl groups having 6 to 10 carbon atoms,
R² denotes divalent alkylene groups having 1 to 8 carbon atoms,
R³ denotes alkyl groups having 1 to 24 carbon atoms, aryl groups, alkoxy groups having 1 to 6 carbon atoms or a hydroxyl group, or
R² and R³ together with the silicon atom may form a 5 membered or 6 membered ring containing a trivalent unbranched or branched alkylene group having 4 to 8 carbon atoms, and
a stands for 80 to 99 mol %,
b stands for 1 to 20 mol %, and
a+b amount to 100 mol %, and the viscosity of the polyorganosiloxane determined at 25° C. is from 100 to 100,000 mPa.S,
(2) as grafted vinyl polymer, from 30 to 50 by weight, of styrene, α-methyl styrene, methacrylic acid ester, acrylic acid ester, meth-acrylonitrile, acrylonitrile or mixtures of these monomers.

8. A latex according to claim 7, containing one or more vinyl monomers corresponding to the following formula

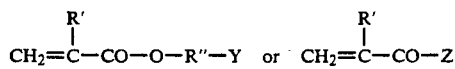
wherein
R' denotes a hydrogen atom or a methyl group,
R" denotes a divalent, unbranched or branched alkylene group having 1 to 18 carbon atoms,
R'" denotes an unbranched or branched alkyl group having 1 to 18 carbon atoms,
Y denotes a hydrogen atom or the group OH or OR,
and
Z denotes OH or the group
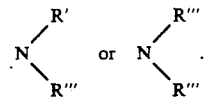
* * * * *